J. A. SCHARF.
DRIVING GEAR FOR AUTOMOBILES.
APPLICATION FILED JUNE 23, 1909.
975,290.
Patented Nov. 8, 1910.
4 SHEETS—SHEET 1.
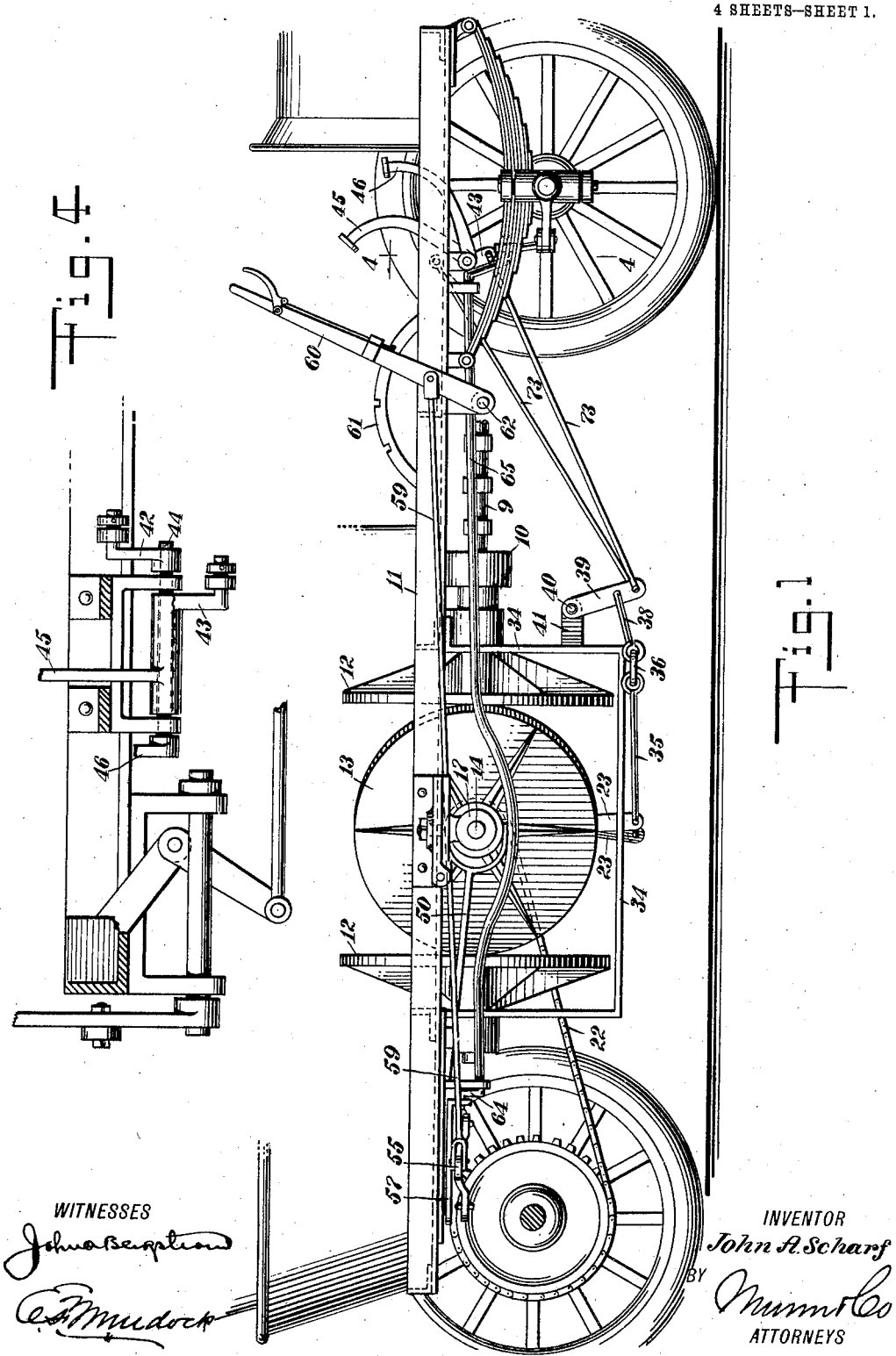
WITNESSES
INVENTOR
John A. Scharf
BY
Munn & Co
ATTORNEYS

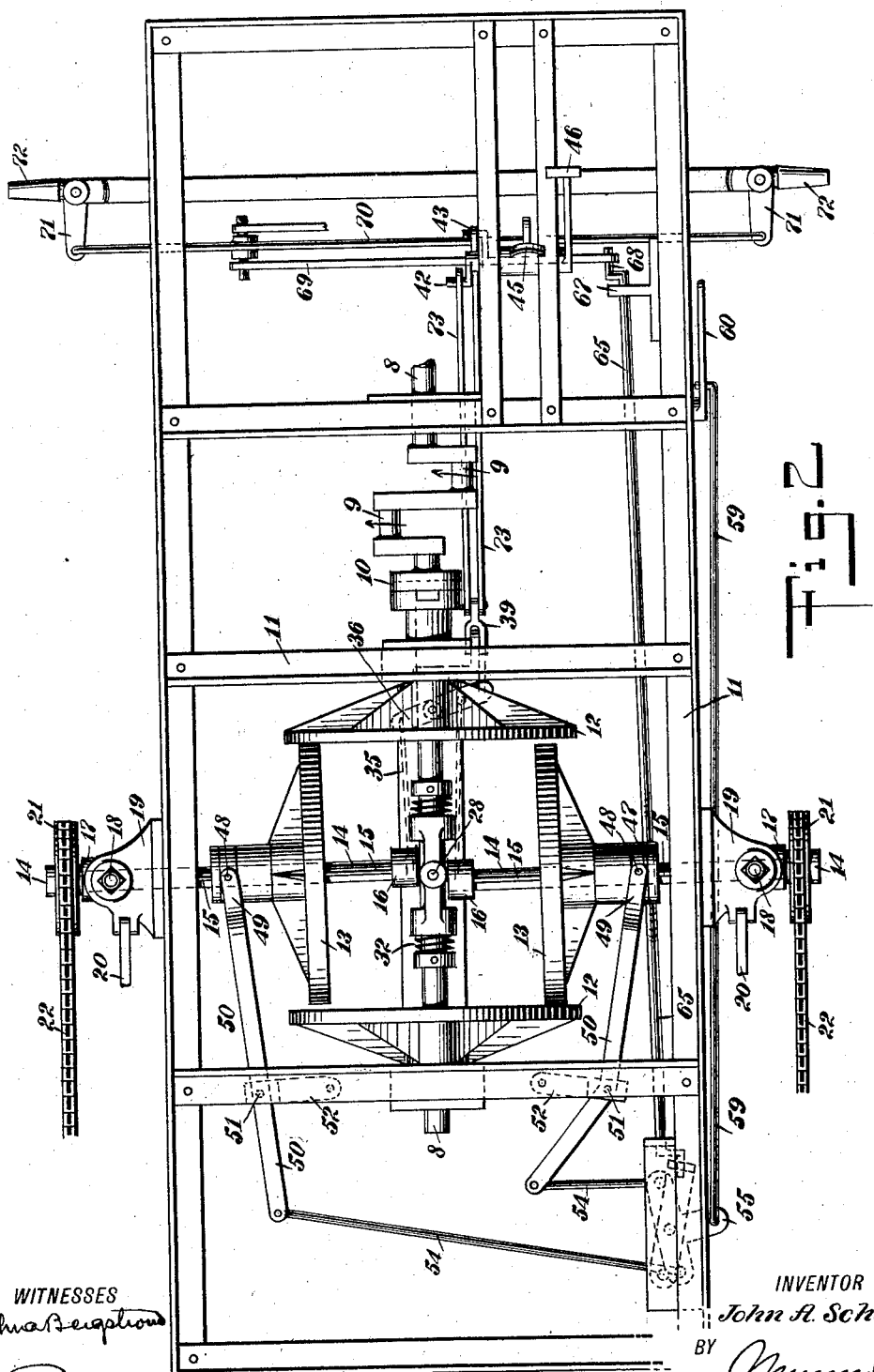

J. A. SCHARF.
DRIVING GEAR FOR AUTOMOBILES.
APPLICATION FILED JUNE 23, 1909.
975,290.
Patented Nov. 8, 1910.
4 SHEETS—SHEET 3.
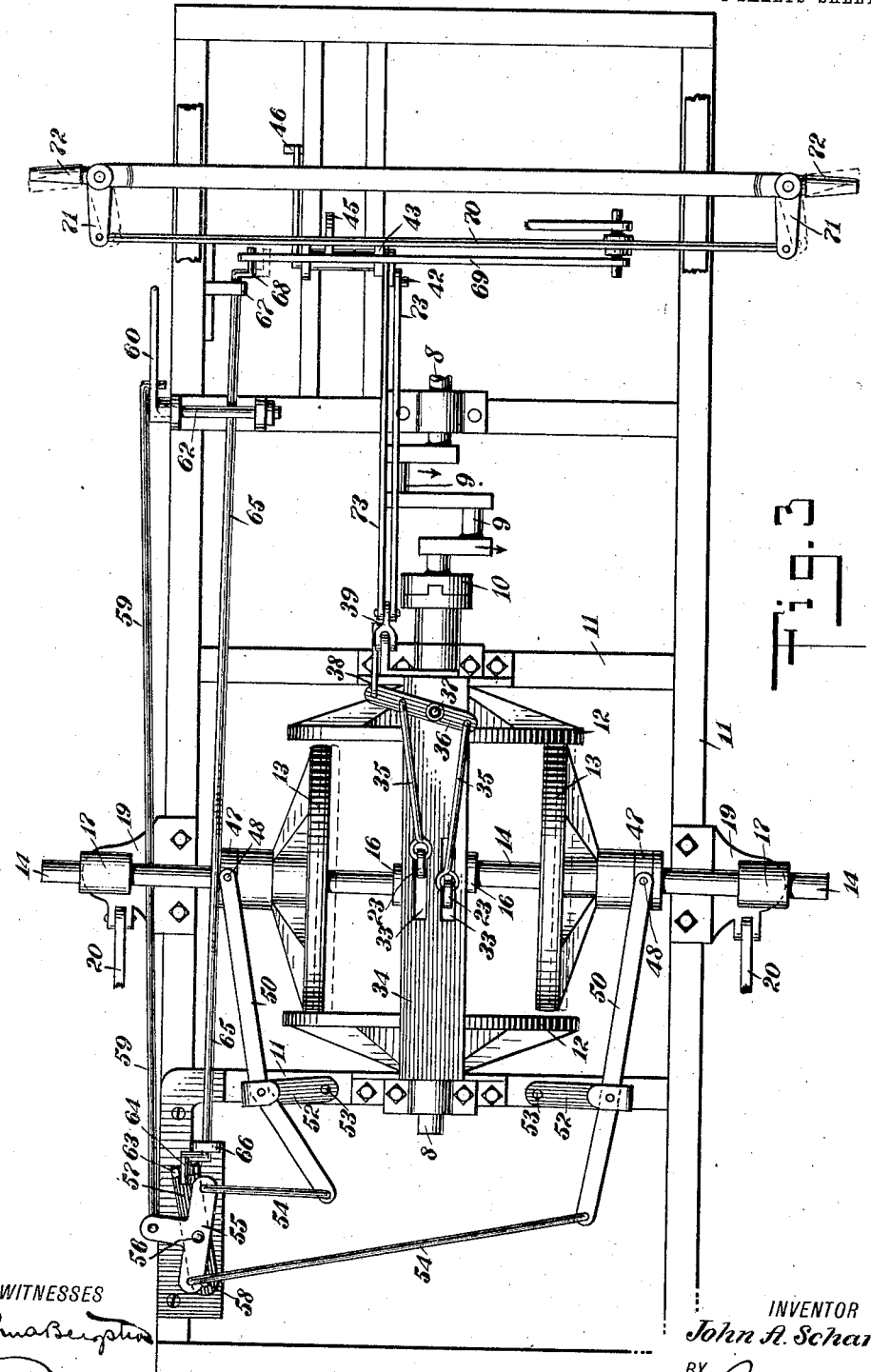
WITNESSES
INVENTOR
John A. Scharf
BY
ATTORNEYS J. A. SCHARF.
DRIVING GEAR FOR AUTOMOBILES.
APPLICATION FILED JUNE 23, 1909.
975,290.
Patented Nov. 8, 1910.
4 SHEETS—SHEET 4.
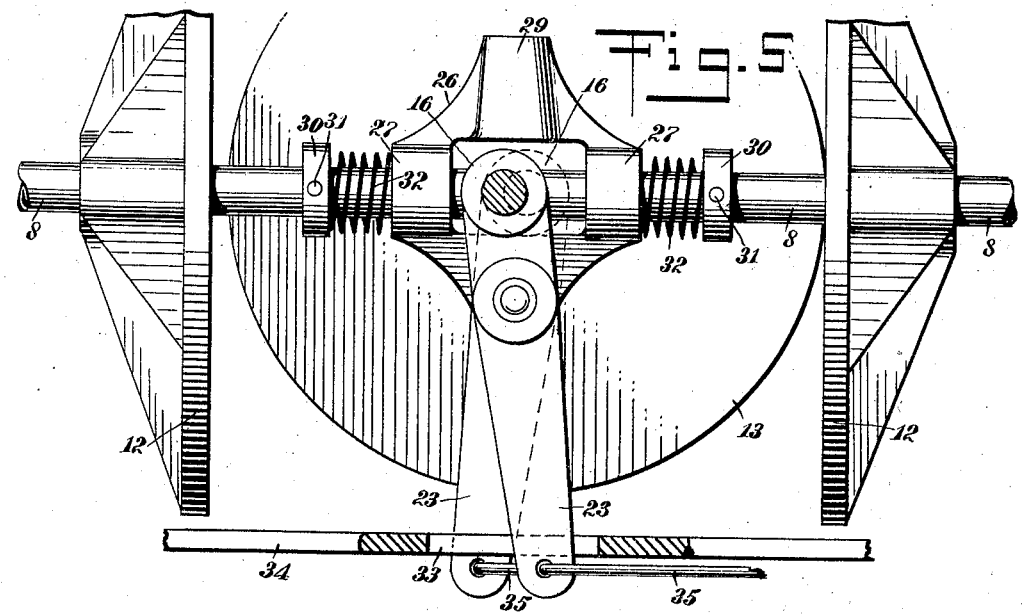
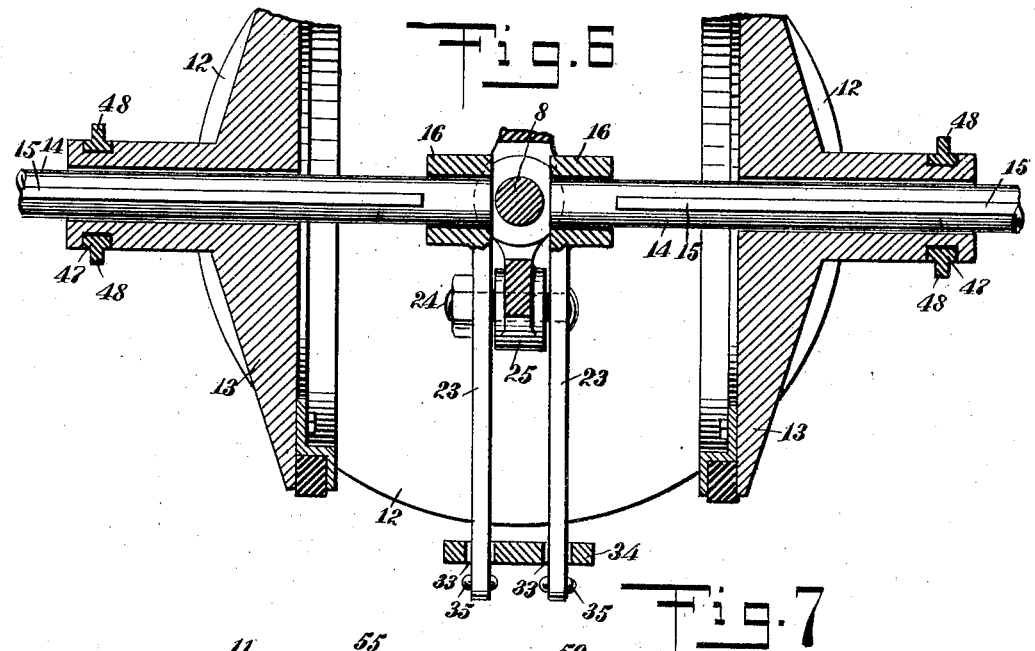
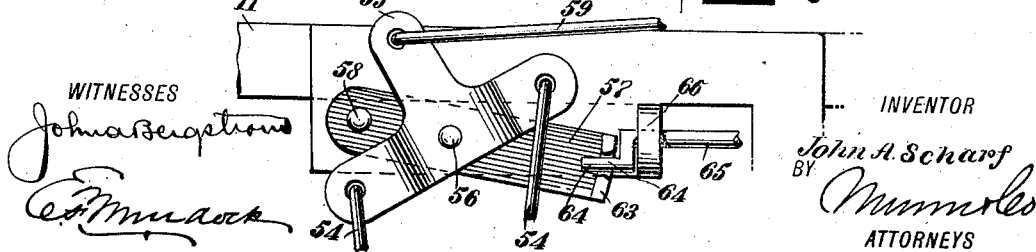
WITNESSES
INVENTOR
John A. Scharf
BY
ATTORNEYS

UNITED STATES PATENT OFFICE.

JOHN A. SCHARF, OF RICHWOOD, OHIO.

DRIVING-GEAR FOR AUTOMOBILES.

975,290.  Specification of Letters Patent.  Patented Nov. 8, 1910.

Application filed June 23, 1909. Serial No. 503,827.

*To all whom it may concern:*

Be it known that I, JOHN A. SCHARF, a citizen of the United States, and a resident of Richwood, in the county of Union and State of Ohio, have invented a certain new and useful Driving-Gear for Automobiles, of which the following is a full, clear, and exact description.

The principal objects which the present invention has in view are: To provide a running gear for automobiles, in which the mechanical expedients of positively engaged members successively operated, are avoided; to provide a running gear for automobiles wherein the equalizing gear comprised of cog wheels, is avoided; to provide a differential action for the driving wheels of the running gear, actuated by the steering gear; and to provide a simple, efficient and durable mechanism for operating the driving wheels of the running gear.

One embodiment of the present invention is disclosed in the structure illustrated in the accompanying drawings, in which like characters of reference denote corresponding parts in all the views.

Figure 1 is a side elevation of an automobile chassis provided with a running gear constructed in accordance with the present invention; Fig. 2 is a plan view from above, of the same, showing the driving disks in position to produce a forward drive of the running gear; Fig. 3 is a plan view from below, showing the operating parts in the same position as illustrated in Fig. 2; Fig. 4 is a cross section of the frame, and operating mechanism, taken on the line 4—4 in Fig. 1; Fig. 5 is an enlarged detail view in longitudinal section, of the driving disks mounted on the engine shaft, and showing in elevation one of the transmission disks; Fig. 6 is a view taken vertically through the transmission disks, showing in cross section the engine shaft and operating members connected therewith; and Fig. 7 is a detail view, enlarged, of the speed control levers and differential mechanism.

The engine shaft 8 is provided at the forward end with cranks 9, 9 and a clutch 10, much as in the present forms of driving mechanism for automobiles. The shaft is mounted securely, and lined up on a frame 11. Fixedly mounted upon the shaft 8 are two large driving disks 12, 12, provided with any suitable form of friction face, and the disks 12, 12 are so mounted that the friction face of each is turned toward the other disk. The disks 12, 12 are rotated with the shaft 8 when the clutch 10 is thrown into engagement, the speed of the disks being the same as that produced on the crank shaft. The starting and stopping levers which are connected with the clutch 10 are not illustrated in the present drawings.

Mounted so as to extend between the disks 12, 12 are transmission friction wheels 13, 13, provided with friction surfaces of suitable construction on their peripheries, adapted to engage the surfaces of the disks 12, 12 in strong frictional engagement. The wheels 13, 13 are slidably mounted upon shafts 14, 14 on which they are guided by feathers 15, 15 extended through the greater part of the length of the shafts 14, 14. The shafts 14, 14 are mounted in bearings in boxes 16, 16 and 17, 17. The boxes 17, 17 are pivoted at 18, 18 in brackets 19, 19 rigidly secured upon the frame 11 and forming clips for rods 20, 20. At the outer extremity of the shafts 14, 14 are mounted sprocket wheels 21, 21 to carry drive chains 22, 22.

The boxes 16, 16 in which are mounted the inner ends of the shafts 14, 14, are formed on the ends of levers 23, 23, pivotally mounted upon a bolt 24 secured in the lower extension 25 of a hanger 26. The hanger 26 is provided with the collars 27, 27 through which the shaft 8 passes, and is maintained in a vertical position by a rod 28 extended within a recess formed in the upper extension 29 of the said hanger. The hanger is held in its longitudinal position on the shaft 8 by set collars 30, 30 which are secured upon the shaft by set screws 31, 31. Between the collars 30, 30 and the collars 27, 27 are mounted heavy compression springs 32, 32, which are provided to relieve any undue strain exerted upon the friction wheels 13, 13 against the disks 12, 12.

The levers 23, 23 are extended downward and through guide slots 33 formed in a plate 34 extended below the hanger 26, and secured to the cross members of the frames 11, 11 beyond the disks 12, 12. The slots 33 likewise assist in maintaining the hanger 26 in a vertical position. To the ends of the levers 23 are secured pull rods 35, 35, which connect the ends of the levers 23 with a rocking bar 36. The connections between the rods 35, 35 and the said rocking bar are on opposite sides of a pivot 37 about which the said bar 36 rotates. The bar 36 is extended, and at one end it is connected with a rod 38, connected with a lever 39 pivoted at 40 upon a bracket 41, rigidly mounted upon the plate 34. The lower end of the lever 39 is connected by rods 73, 73 to the ends of cranks 42, 43, the former of which is extended above and the latter is extended below, a pivot rod 44 to which both cranks are fixedly secured (see Fig. 4 of the drawings). To the pivot rod 44 are suitably connected pedals 45 and 46, having foot rests located within the body of the automobile, and convenient to the foot of the chauffeur.

By reason of the extension of the cranks 42 and 43 in opposite directions, whenever the one or the other of the pedals 45 or 46 is depressed by the foot of the chauffeur, the lever 39 is thrown backward or drawn toward the front of the vehicle. As the lever 39 is thus moved, the bar 36 is rocked upon its pivot 37, to change the relative positions of the ends of the levers 23, 23, through the pull rods 35, 35.

By the mounting above described of the shafts 14, 14 in the boxes 17, 17 and 16, 16, the latter of which are adapted to be shifted longitudinally, the wheels 13, 13 are caused to approach and recede from either of the disks 12, 12. The disks 12, 12 are rotated constantly in one direction, and the wheels 13, 13 contact with the said disks on opposite sides thereof.

By the construction wherein the boxes 16, 16 are mounted upon the levers 23, 23 the movement whereof is controlled by a single member, to wit: the rocking bar 36, the relative movement of the said wheels is equal and opposite. Hence, when the wheel on one side of the longitudinal center is engaged with the disk 12 forward of the shafts 14, the opposite wheel 13 is engaged with the rearwardly disposed disk 12. In this position there is imparted to each of the wheels 13 the same rotary direction, which, being transmitted to the shafts 14, 14 is by them transmitted to the driving wheels of the automobile. When either of the pedals 45 or 46 which has caused the engagement of the wheels 13, 13 with the disks 12, 12 is released, the boxes 16, 16 are moved to their median position, drawing both wheels 13, 13 from the disks 12, 12. In this position, no driving power being applied to the shafts 14, 14, the automobile runs free or is brought to a stop by manipulating the brake mechanism.

As shown in the present drawings, the pedal 46 when depressed, as shown in Fig. 1, causes the engagement of the wheels 13, 13 with the disks 12, 12, to produce a forward drive on the running gear of the automobile. When it is desired to reverse the driving of the running gear of the automobile, the pedal 46 is released, and the pedal 45 is depressed, causing a reverse engagement of the wheels 13, 13 with the disks 12, 12, wherein the wheels 13, 13 receive the opposite rotary motion from the said disks 12, 12.

Having thus described the mechanism whereby the driving mechanism of the running gear is controlled to produce a forward or rearward drive of the automobile, there will now be taken up the mechanism whereby the speed of the driving gear is controlled.

As above mentioned, the wheels 13, 13 are mounted upon the shafts 14, 14 and are held in slidable relation thereto by the feathers 15, 15. The hubs of the wheels 13, 13 are grooved to receive collars 47 which are provided with pivot pins 48, 48 to receive yokes 49, 49 formed on the ends of levers 50, 50, pivoted at 51, 51 in swing plates 52, 52 which are pivotally mounted at 53, 53 upon the frame 11. The ends of the levers 50, 50 are connected by pull rods 54, 54 to a rocking triple arm lever 55, pivoted at 56 upon a plate 57 which is mounted at 58 upon the frame of the machine. To the intermediate arm of the three arms of the lever 55 there is connected a pull rod 59 which at the forward end is secured to a hand lever 60, provided with suitable detents to engage the teeth of a quadrant 61, suitably mounted upon the frame of the automobile, as shown in Fig. 1 of the drawings. The lever 60 is pivoted at 62 in a bracket set out from the frame 11 of the automobile.

It will be observed that with the plate 57 maintained in a stationary position, the operation of the levers 50, 50 and the triple arm lever 55 is as follows:—The extensions of the lever 55 at both sides of the center 56 are moved in opposite directions, causing the ends of the levers 50, 50 to which the rods 54, 54 are connected, to approach and recede from each other. This action at the outer end of the levers 50, 50 produces an opposite action on the inner or yoke bearing ends of the said levers. The effect of this is that when the lever 60 is moved toward the rear of the car, from the position in which it is shown in Fig. 2, the lever 55 is rocked to spread the outer ends of the levers 50 50 and cause the inner yoke bearing ends to approach each other. These yoke bearing ends being engaged with the collars 47, 47 operate to carry the wheels 13, 13 toward the center of the disks 12, 12. The frictional contact between the peripheries of the wheels 13, 13 and the disks 12, 12 being transferred to the section of the disks having a lesser diameter, the resultant travel of the wheels 13, 13 is slower than in the outer position. This lateral adjustment may be made while the disks 12, 12 and the wheels 13, 13 are running.

With a speed controlling gear such as described, the change from one to another speed is easy, and may be made under all running conditions of the automobile.

In the present construction, I have dispensed with the usual differential gear. In the place thereof I have substituted the plate 57 which is pivoted at 58 and carries the pivot 56 of the triple arm lever 55. Extended from the plate 57 is an ear 63 to form an open slotted construction to receive crank pin 64, which is formed on the end of a rod 65, journaled in an extension 66 set down from the framing member, and a bracket 67 extended from the framing member in the forward end of the chassis. At the forward end of the rod 65 is provided a crank pin 68 engaged with the free end of a connecting link 69 which, in turn, is pivoted upon a tie rod 70 extended between knuckle arms 71, 71 of steering knuckles 72, 72 forming bearings for the steering wheels of the automobile. The steering mechanism is suitably connected with the tie rod 70 to throw the knuckle arms 71, 71 to steer the automobile. In thus throwing the tie rod 70, the rod 65 is rocked in such manner that the plate 57 is moved upon its pivot 58, and in thus moving the plate 57, the triple arm lever 55 is moved laterally, without changing the pivotal position. The result of this action is that the rods 54, 54 and the levers 50, 50 connected therewith, are simultaneously moved in the same direction. With the movement of the levers 50, 50, the wheels 13, 13 are shifted on the disks 12, 12; one shift is shown by dotted lines in Fig. 3 of the drawings. In thus shifting the wheels 13, 13, the wheel on one side of the shaft 8 is moved toward the center of the disks 12, 12, while the other wheel is moved toward the periphery of said disks. This action results in a diminution of speed in one wheel 13 while accelerating the speed in the other wheel 13. This action is proportioned to the rate of increase and decrease occasioned in the driving wheels of the automobile running in a curved path.

With mechanism just above described, by reason of the fact that with the shift of the steering wheels, the proportionate driving torque is likewise changed in the driving wheels, the tendency to skid is materially lessened. It will be noticed that whereas in other makes of machines, the differential gear operates in answer to the drag on the other wheel, in the present form of construction, the differential gear operates to cause the required variation in speed of the two driving wheels. This forms a machine sensitive, but true, in its steering action.

With an automobile constructed as described, having the various groups of instrumentalities mentioned, the operation is as follows: Upon entering the automobile and having started the engine, the clutch 10 is thrown into engagement to lock the crank shaft and the driving shaft 8. In this position the wheels 13, 13 are out of engagement with the disks 12, 12. The lever 60 is thrown back, from the position shown in Fig. 1, to cause the wheels 13, 13 to approach each other and the rotary center of the disks 12, 12. The pedal 46 is now depressed, causing the levers 23, 23 to rock, carrying the boxes 16, 16 to position as shown in Fig. 2 of the drawings, wherein the wheels 13, 13 are forced against the disks 12, 12 in such manner as to drive the automobile in a forward direction. The wheels 13, 13 being in contact with the disks 12, 12 near the rotary center thereof, the movement imparted to the driving wheels is very slow. As the machine makes headway, the lever 60 is moved gradually forward until the wheels 13, 13 are drawn outward, over the face of the disks 12, 12, attaining gradually the full peripheral speed of the disks 12, 12. The automobile is, in this position, under full head. On turning a corner, the steering gear is manipulated to throw the rod 70 and with it the knuckle arms 71, 71 to the proper steering positions for the steering wheel. In doing this the rod 65 is rocked to throw the plate 57 to a lateral position, wherein the levers 50, 50 are shifted to throw the wheels 13, 13 to the position shown in Fig. 3 of the drawings. In this position the wheel 13 on the outer side of the curved path produced by the steering wheels, is impelled to move slightly faster than before being shifted, while the wheel 13 on the inside of the curved path is impelled to move proportionately slower. The relative change in speed between the two wheels 13, 13 corresponds with the needed change in speed of the driving wheels for the automobile.

It will be observed that if the curve be sharp the differences in speed of the driving wheels will be correspondingly great, and if the curve be slight, the difference in speed between the driving wheels will be correspondingly small. Having rounded the curve, the steering gear is manipulated to straighten the steering wheels, and in so doing, the wheels 13, 13 are shifted to their original position on the disks 12, 12. When it is desired to stop the machine, the pedal 46 is released, permitting the levers 23, 23 to assume a position, wherein the wheels 13, 13 are removed from the disks 12, 12. In this position the automobile would run with its acquired momentum, unless arrested by a suitable brake mechanism. If it be desired to reverse the driving direction, this is accomplished by now depressing the pedal 45, when the levers 23, 23 would be shifted to move each of the wheels 13, 13 from the disk 12, with which it has been engaged, to the other disk. In this position the wheels 13, 13 receive the required rotary motion to drive the shafts 14, 14 and the driving wheels of the automobile, to cause the same to run backward.

It will be observed that the pressure exerted upon the disks 12, 12 by the wheels 13, 13, is regulated by the compression springs 32, 32. These also operate in such manner that if at any time in the driving of the machine the driving strain becomes too great, the springs 32, 32 yield to relieve such strain. Breakage in the mechanism may thus be prevented, and the springs 32, 32 thus act as a safety device.

Having thus described my invention, what I claim as new and desire to secure by Letters Patent is:

1. A driving gear for automobiles comprising a driving shaft mounted upon the body of the automobile; two friction driving disks fixedly mounted thereon in separated relation; two short shafts extended from between the said disks to the sides of the body of the automobile; a bearing for each of the said shafts mounted on the body of the automobile and pivoted to swing the said shafts in a horizontal plane; a swinging bearing for each of the said short shafts to support the inner ends thereof; a plurality of friction wheels one fixedly mounted on each of the said short shafts and disposed between the faces of the said driving disks and having a peripheral surface adapted to successively engage the faces of the said driving disks; a plurality of transmission gears one mounted on the outer end of each of said short shafts; a plurality of transmission gears one fixedly attached to each of the driving wheels of the automobile; a flexible connection between the said transmission gears; manually operated means connected with the inner ends of said short shafts to swing the same in directions opposite and substantially parallel to said driving shaft to cause each of the said wheels carried thereby to impinge upon one of the said friction driving disks; a plurality of levers pivotally mounted on the body of the automobile and engaged with the friction wheels to move the same longitudinally on the said short shafts; a rocking lever having arms extended oppositely from the pivot thereof, each of said arms being connected with the free end of one of said levers; a pivot plate supporting and pivotally connected with the said rocking lever, said plate being pivotally mounted upon the automobile frame; means for manually operating the said rocking lever to cause the said friction wheels to move toward and away from the center of said driving disks; and means embodying the steering gear for moving the said pivot plate on its pivot center to laterally shift the free ends of said levers.

2. A driving gear for automobiles comprising a driving shaft mounted upon the body of the automobile; two friction driving disks fixedly mounted thereon in separated relation; two short shafts extended from between the said disks to the sides of the body of the automobile; a bearing for each of the said shafts mounted on the body of the automobile and pivoted to swing the said shafts in a horizontal plane; a swinging bearing for each of the said short shafts to support the inner ends thereof; a plurality of friction wheels one fixedly mounted on each of the said short shafts and disposed between the faces of the said driving disks and having a peripheral surface adapted to successively engage the faces of the said disks; a plurality of transmission gears one mounted on the outer end of each of said short shafts; a plurality of transmission gears one fixedly attached to each of the driving wheels of the automobile; a flexible connection between the said transmission gears; manually operated means connected with the inner ends of said short shafts to swing the same in directions opposite and substantially parallel to said driving shaft to cause each of the said wheels carried thereby to impinge upon one of the said friction driving disks; a plurality of levers pivotally mounted on the body of the automobile and engaged with said friction wheels to move the same to and from the center of said driving disks; a rocking lever having arms extended in opposite directions from the pivotal center thereof; means for connecting the ends of said extended arms on said rocking lever and the free ends of said levers connected with the said wheels; a pivot plate pivotally connected with said rocking lever and pivoted at one end thereof to the body of the automobile; a suitable steering gear for the automobile; and transmission devices connected with said steering gear and with the said pivot plate to swing the said plate on its pivot and in unison with said steering gear.

3. In a motor vehicle, the combination with the frame, the steering wheels, and the driving wheels, of a driving shaft mounted on the frame, two confronting friction disks secured to the shaft, two driven shafts disposed transversely to the driving shaft between the friction disks so as to allow the inner ends to oscillate in a horizontal plane, driving connections between the outer ends of the driven shafts and the driving wheels, a friction wheel splined on each of said driven shafts, means connected to the inner ends of said driven shafts for moving them simultaneously transversely in opposite directions to bring the friction wheels alternately into contact with the confronting disks, means connected with the friction wheels to move them simultaneously in opposite directions along their respective shafts, and means connected to the last said means and also with the steering wheels for moving said friction wheels simultaneously in the same direction on their respective shafts, whereby steering movement of the steering wheels results in corresponding differential speed of the driving wheels.

In witness whereof I have signed my name to the above specification in the presence of two subscribing witnesses.

JOHN A. SCHARF.

Witnesses:
L. L. STREET,
GEO. W. WADEN.